(12) United States Patent
Elliott et al.

(10) Patent No.: US 7,887,118 B2
(45) Date of Patent: *Feb. 15, 2011

(54) SIMULTANEOUS MOVEMENT SYSTEM FOR A VEHICLE DOOR

(75) Inventors: Adrian Nicholas Alexander Elliott, Dearborn, MI (US); Jason Falenski, Berkley, MI (US); Dave Michael Lechkun, Shelby Township, MI (US); Craig Blust, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

This patent is subject to a terminal disclaimer.

(21) Appl. No.: 12/275,573

(22) Filed: Nov. 21, 2008

(65) Prior Publication Data

US 2010/0127530 A1 May 27, 2010

(51) Int. Cl.
B60J 5/06 (2006.01)

(52) U.S. Cl. .................. 296/155; 296/146.12

(58) Field of Classification Search ............ 296/146.1, 296/155, 146.9, 146.11, 146.12; 16/357–360; 49/209, 210, 211, 213, 216, 218, 219, 221, 49/223, 360
See application file for complete search history.

(56) References Cited

U.S. PATENT DOCUMENTS

| | | | |
|---|---|---|---|
| 3,051,999 A | 9/1962 | Schimek | |
| 3,075,803 A | * 1/1963 | Wilfert | 49/212 |
| 3,313,063 A | 4/1967 | Patin | |
| 3,619,853 A | 11/1971 | Merrill | |
| 3,628,216 A | 12/1971 | Savell | |
| 3,935,674 A | 2/1976 | Williams et al. | |
| 4,025,104 A | 5/1977 | Grossbach et al. | |
| 4,135,760 A | 1/1979 | Grossbach | |
| 4,945,677 A | 8/1990 | Kramer | |
| 5,139,307 A | 8/1992 | Koops et al. | |
| 5,251,953 A | 10/1993 | Willey | |
| 5,398,988 A | 3/1995 | DeRees et al. | |
| 5,507,119 A | 4/1996 | Sumiya et al. | |
| 5,561,887 A | 10/1996 | Neag et al. | |
| 5,812,684 A | 9/1998 | Mark | |
| 5,846,463 A | 12/1998 | Keeney et al. | |
| 5,921,613 A | 7/1999 | Breunig et al. | |
| 6,030,025 A | 2/2000 | Kanerva | |

(Continued)

FOREIGN PATENT DOCUMENTS

DE  102004039885  2/2006

(Continued)

*Primary Examiner*—Jason S Morrow
(74) *Attorney, Agent, or Firm*—Gregory P. Brown; Price, Heneveld, Cooper, DeWitt & Litton, LLP

(57) ABSTRACT

A simultaneous movement system for a vehicle door includes a vehicle door having a door inner panel, first and second outboard members, first and second inboard members, first and second guide tracks, a third curved guide track, first and second points on the second outboard member, and first and second slide members. The first and second guide tracks are operatively mounted to the vehicle door. The third curved guide track may be operatively mounted to the vehicle door and is configured to receive a second point on the second outboard hinge arm. The first point on the second outboard hinge arm may be pivotally mounted on a second slide member.

17 Claims, 3 Drawing Sheets

U.S. PATENT DOCUMENTS

| | | |
|---|---|---|
| 6,183,039 B1 | 2/2001 | Kohut et al. |
| 6,196,618 B1 | 3/2001 | Pietryga et al. |
| 6,213,535 B1 | 4/2001 | Landmesser et al. |
| 6,299,235 B1 | 10/2001 | Davis et al. |
| 6,382,705 B1 | 5/2002 | Lang et al. |
| 6,394,529 B2 | 5/2002 | Davis et al. |
| 6,447,054 B1 | 9/2002 | Pietryga et al. |
| 6,572,176 B2 | 6/2003 | Davis et al. |
| 6,629,337 B2 | 10/2003 | Nania |
| 6,793,268 B1 | 9/2004 | Faubert et al. |
| 6,802,154 B1 | 10/2004 | Holt et al. |
| 6,817,651 B2 | 11/2004 | Carvalho et al. |
| 6,826,869 B2 | 12/2004 | Oberheide |
| 6,860,543 B2 | 3/2005 | George et al. |
| 6,926,342 B2 | 8/2005 | Pommeret et al. |
| 6,942,277 B2 | 9/2005 | Rangnekar et al. |
| 6,997,504 B1 | 2/2006 | Lang et al. |
| 7,000,977 B2 | 2/2006 | Anders |
| 7,032,953 B2 | 4/2006 | Rangnekar et al. |
| 7,104,588 B2 | 9/2006 | George et al. |
| 7,168,753 B1 | 1/2007 | Faubert et al. |
| 7,178,853 B2 | 2/2007 | Oxley et al. |
| 7,219,948 B2 | 5/2007 | Curtis, Jr. et al. |
| 7,243,978 B2 | 7/2007 | Mather et al. |
| 7,393,044 B2 | 7/2008 | Enomoto |
| 7,438,346 B1 * | 10/2008 | Breed ............... 296/146.4 |
| 7,469,944 B2 | 12/2008 | Kitayama et al. |
| 7,552,953 B2 | 6/2009 | Schmoll et al. |
| 7,611,190 B1 | 11/2009 | Elliott et al. |
| 7,640,627 B2 | 1/2010 | Lowen et al. |
| 7,658,438 B1 * | 2/2010 | Elliott et al. ............ 296/155 |
| 7,765,740 B2 * | 8/2010 | Heuel et al. ............ 49/360 |
| 2002/0096800 A1 | 7/2002 | Keeney et al. |
| 2003/0218358 A1 | 11/2003 | Hahn |
| 2005/0093337 A1 | 5/2005 | Herrmann et al. |
| 2005/0116496 A1 | 6/2005 | Lowson et al. |
| 2005/0146159 A1 | 7/2005 | Shen et al. |
| 2006/0059799 A1 | 3/2006 | Zimmer et al. |
| 2006/0103047 A1 | 5/2006 | Zwolinski |
| 2006/0267375 A1 * | 11/2006 | Enomoto ............... 296/155 |
| 2007/0075565 A1 | 4/2007 | Magsaam |
| 2007/0085374 A1 | 4/2007 | Mather et al. |
| 2008/0224501 A1 | 9/2008 | Zimmer et al. |
| 2009/0070960 A1 | 3/2009 | Elliott et al. |
| 2009/0072582 A1 | 3/2009 | Elliott et al. |
| 2009/0072583 A1 | 3/2009 | Elliott et al. |

FOREIGN PATENT DOCUMENTS

| | | |
|---|---|---|
| EP | 0875434 | 11/1998 |
| EP | 0957019 | 11/1999 |
| JP | 2004175199 | 6/2004 |
| JP | 2005153738 | 6/2005 |
| JP | 2008094323 | 4/2008 |
| WO | WO 02/42589 | 5/2002 |
| WO | WO2006/005572 | 1/2006 |

* cited by examiner

SIMULTANEOUS MOVEMENT SYSTEM FOR A VEHICLE DOOR

BACKGROUND

The present disclosure relates generally to hinge and slide devices, and more particularly, to such a device for vehicle doors.

Sliding door structures are generally implemented on vehicles to reduce the door swing distance from the vehicle body; to allow for better ingress and egress into or from a vehicle; and to improve package of a vehicle. This type of design is particularly helpful when a user is parking a vehicle in a confined area where there is little available room for door swing.

In the sliding door structure, guide rails are generally included at the roof rail/cant rail and rocker/sill as well as adjacent to a vehicle body class A surface. The guide rail on the class A surface is generally configured as a linear track just below the side window. In addition, such vehicles generally also implement a curved guide track on the vehicle body at the sill and or side rail/cant rail to guide the sliding door into the closed position against the vehicle body. To open the sliding door, the sliding door is projected in a vehicle exterior direction along the curved portion of the guide rail and then the sliding door is moved along the linear portion to a fully opened position. To close the sliding door, the sliding door is moved to the curved portion from the linear portion of the guide rail and then the sliding door is pulled inward against the vehicle to a closed position.

However, the sliding door movement does coincide with the curved shape of the guide rail once it transitions from the linear portion to the curved portion resulting in a distinct two step operation for opening and closing the sliding door.

SUMMARY

A simultaneous movement system for a vehicle door according to embodiment(s) includes a vehicle door having a door inner panel, first and second outboard members, first and second inboard members, first and second guide tracks, a third curved guide track, first and second points on the second outboard member, and first and second slide members. The first and second guide tracks are operatively mounted to the vehicle door. The third curved guide track may be operatively mounted to the vehicle door and is configured to receive a second point on the second outboard hinge arm. The first point on the second outboard hinge arm may be pivotally mounted on a second slide member.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure provides a simultaneous movement system for a sliding and articulating vehicle door wherein the class A surface of the vehicle is not disrupted with a door track for the sliding door system, and allows for stable, yet simultaneous sliding and articulating of a vehicle door. The simultaneous movement system disclosed herein substantially and advantageously overcomes at least the potential drawbacks noted in the background above.

Referring now to FIGS. 1-5, a simultaneous movement system 10 for a vehicle door 12 may generally be mounted onto a vehicle. As described in greater detail below, in order to facilitate ingress and egress into and from a vehicle (not shown), the simultaneous movement system 10 for a vehicle door 12 may allow for smooth and continuous opening/closing of a door 12 independent of another adjacent structure or door (not shown) being open or closed. It is to be understood that mass production vehicles having independently opening doors are not readily available at this time due to proper closure and sealing issues as the doors mate together.

Figure 1:
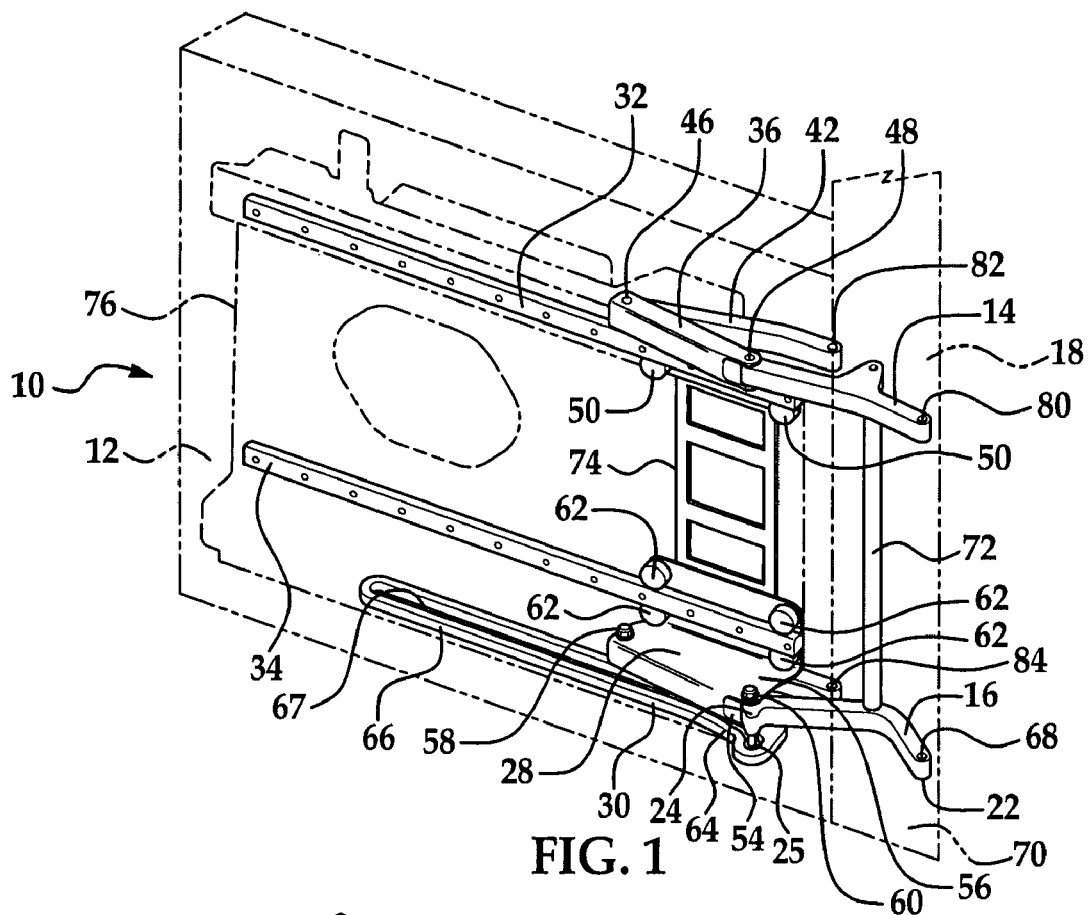
FIG. 1 is an isometric view of an embodiment of a controlled simultaneous articulating and sliding door system (vehicle door and vehicle body shown in phantom) when the door is in the closed position.
Figure 2:
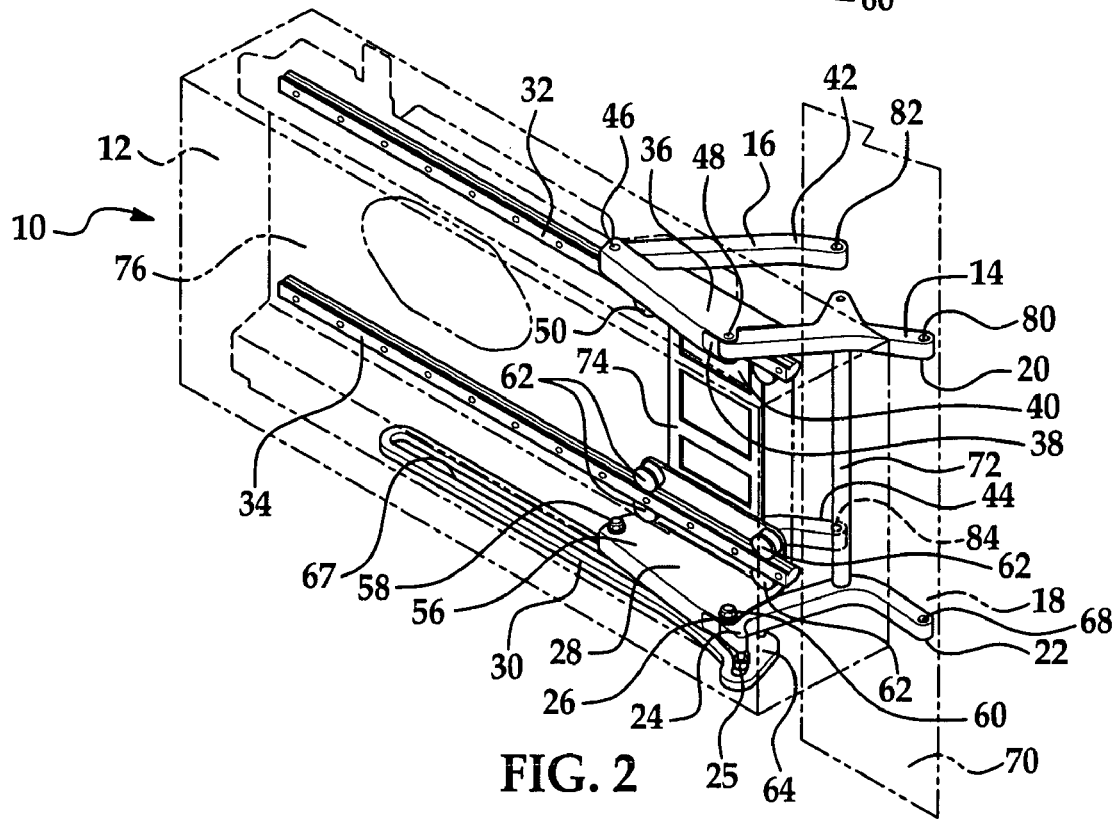
FIG. 2 is an isometric view of the controlled simultaneous articulating and sliding door system of FIG. 1 (vehicle door and vehicle body shown in phantom) when the door is in its initial opening state.
Figure 3:
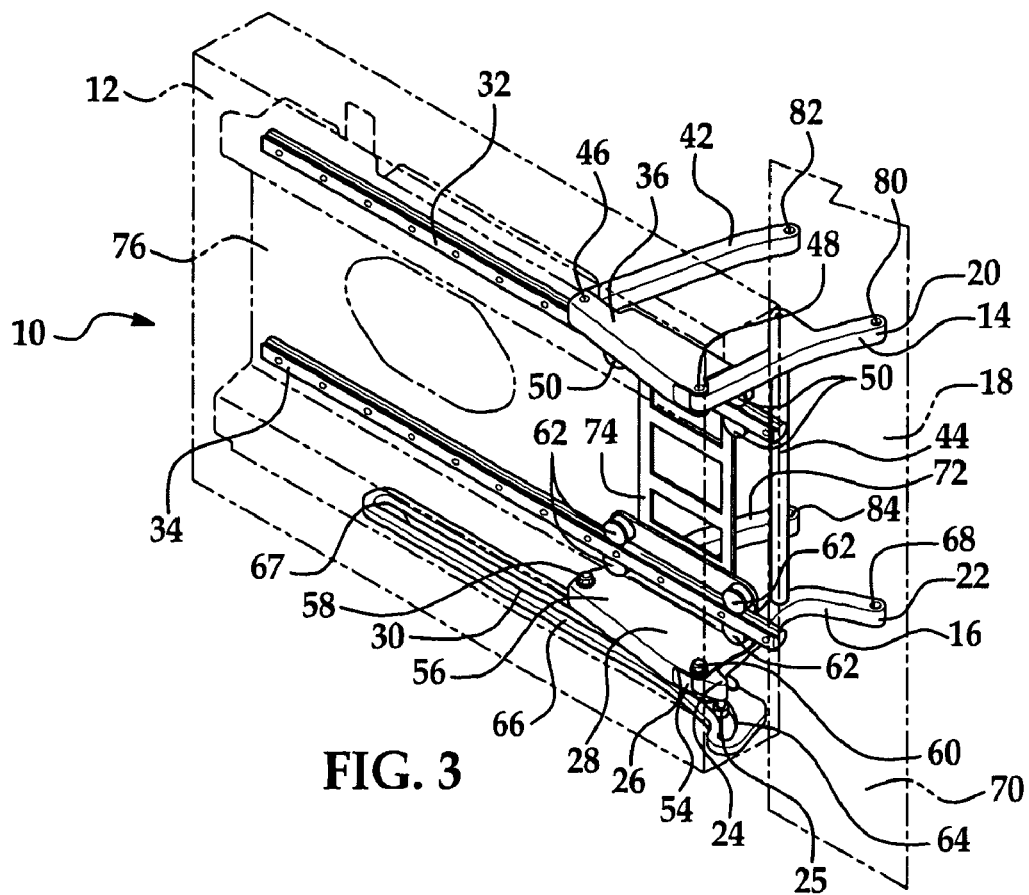
FIGS. 3 and 4 are isometric views of the controlled simultaneous articulating and sliding door system of FIG. 1 (vehicle door and vehicle body shown in phantom) when the door is in its progressively opening states.
Figure 4:
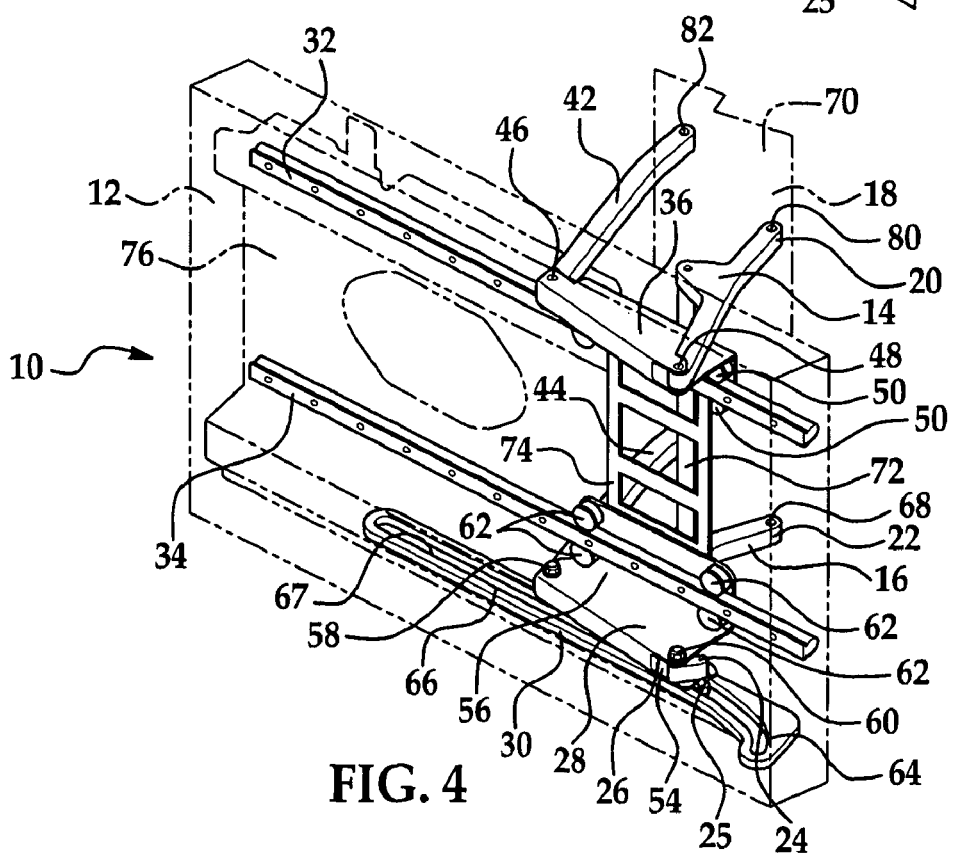
Figure 5:
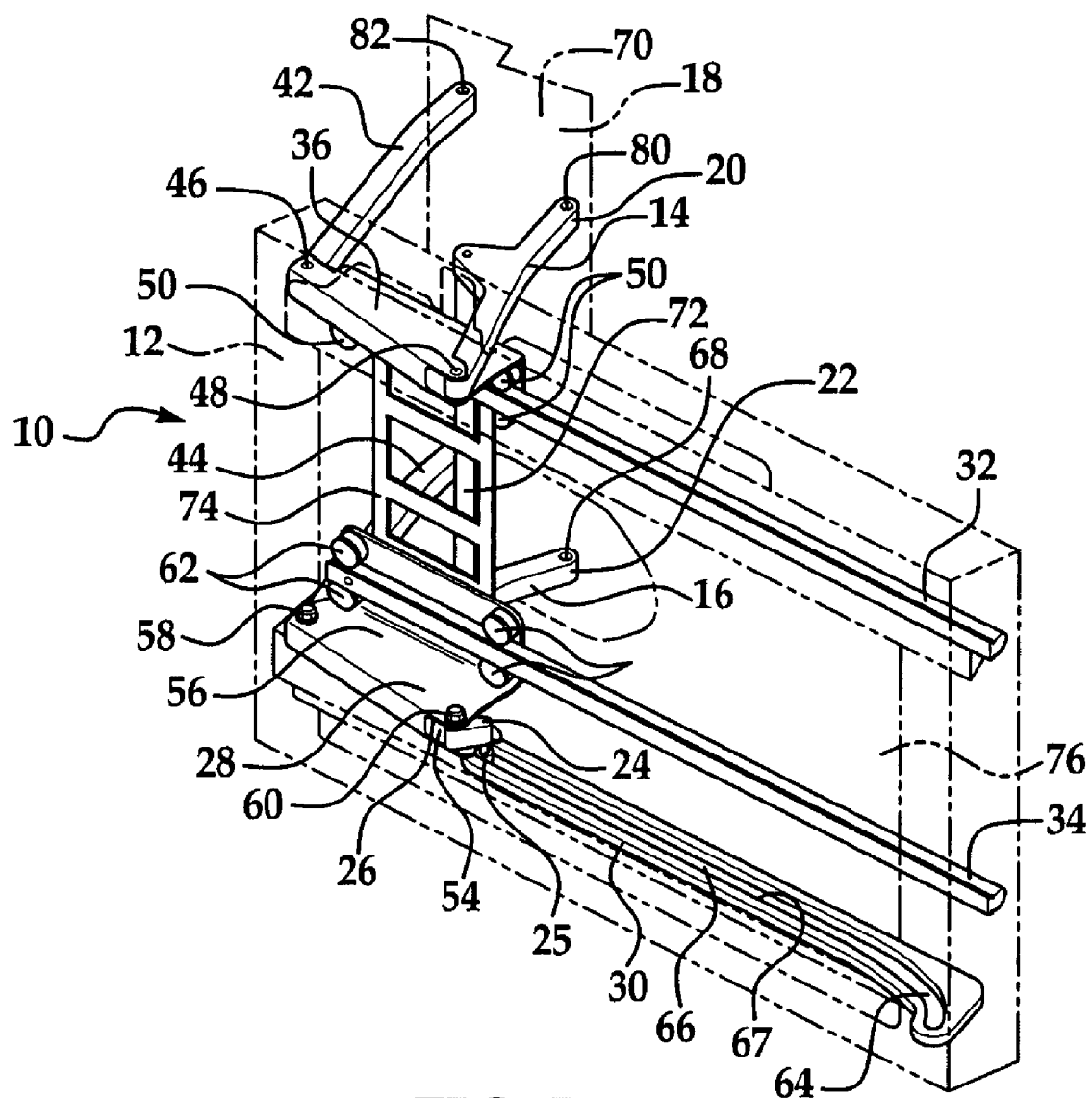
FIG. 5 is an isometric view of an embodiment of a controlled simultaneous articulating and sliding door system (vehicle door and vehicle body shown in phantom) when the door is in its fully open state.

As shown in FIG. 1, simultaneous movement system 10 may include two outboard hinge arms 14, 16. The outboard hinge arms 14, 16 are pivotally mounted to a vehicle pillar 18 at pivot joints 80, 68 at first end 20, 22 of outboard hinge arms 14, 16. Simultaneous movement system 10 may also include inboard hinge arms 42, 44 which are pivotally mounted to vehicle pillar 18 at pivot joints 82, 84 of inboard hinge arms 42, 44. At least one of outboard hinge arms 14, 16 is operatively configured to include at least two points 24, 26 along outboard hinge arm 16. In FIGS. 1-5, as a non-limiting example only, outboard hinge arm 16 is the outboard hinge arm 16 having such points 24, 26. However, it is to be understood that both outboard hinge arms 14, 16 may be configured identically so that each outboard hinge arm 14, 16 includes points 24, 26.

Hinge arm 16 is pivotally connected to slider member 28 at first point 26 and is engaged with third guide track 30 at second point 24. In one non-limiting example, second point 24 may include a one piece tab 25 which fits within a channel 67 of third guide track 30 as shown in FIGS. 1-5. Any suitable fastener, such as, e.g., a nut and bolt as shown in FIG. 1, may affix tab 25 to second point 24 on outboard hinge arm 16. In yet another non-limiting example, a projection (not shown) integral with outboard hinge arm 16 may be used wherein the projection is configured to slide within third guide track 30.

As shown in FIGS. 1-5, simultaneous movement system 10 includes first guide track 32 mounted to door inner panel 76. In two non-limiting examples, first guide track 32 and second guide track 34 may be mounted to door inner panel 76 and/or door hardware system (not shown) via any suitable fastening means, including but not limited to mechanical fasteners, welding, press-fitting, interlocking, or any other suitable joining method. First guide track 32 is operatively configured to receive first slide member 36. First slide member 36 as shown in FIG. 1 is one non-limiting example in which one may implement a sliding structure along first guide track 32. The example of first slide member 36 shown in FIG. 1 is a stamped member which defines two grooves or recesses 38, 40. First recess 38 of first slide member 36 receives inboard hinge arm 42 and outboard hinge arm 14. Inboard hinge arm 42 and outboard hinge arm 14 are each attached to first slide member 36 through pivot joints 46, 48.

Second recess 40 of first slide member 36 receives first guide track 32. Second recess 40 partially surrounds first guide track 32. Slide member 36 further includes rollers 50 (as shown in FIGS. 1-5), bearings (not shown) or like sliding components so that slide member 36 may be configured to operatively cooperate with first guide track 32. Slide member 36 may be manufactured using a stamping or casting process.

A second guide track 34 is also implemented in FIG. 1 where second guide track 34 is mounted to vehicle door 12. Second guide track 34, similar to first guide track 32, may be mounted to vehicle door 12 by attaching second guide track 34 to door inner panel 76 or door latch hardware structure (not shown). Second guide track 34 is operatively configured to receive second slide member 28. Similar to first slide member 36, second slide member 28 may be a stamped or roll-formed component and may define two grooves or recesses 54, 56 as shown in FIGS. 1-5.

First recess 54 of second slide member 28 receives inboard hinge arm 44 and outboard hinge arm 16. Inboard hinge arm 44 and outboard hinge arm 16 are each attached to second slide member 28 through inboard pivot joint 58 and first point 26. As shown in FIG. 1 as a non-limiting example, second recess 56 of second slide member 52 receives second guide track 34. Second recess 56 may partially surround second guide track 34. Slide member 28 may further include rollers 62 as shown in FIGS. 1-5, bearings (not shown) or like sliding components so that slide member 28 may be operatively configured to receive and slide or translate along second guide track 34.

In order to allow vehicle door 12 to articulate and slide simultaneously and smoothly, third guide track 30 may be implemented. As indicated earlier, third guide track 30 is operatively configured to receive second point 24 on outboard hinge arm 16. Third guide track 30 includes a substantially curved portion 64 and a substantially linear track portion 66 to allow smooth and simultaneous articulation and sliding movement of vehicle door 12. Thus, as door 12 moves along third track 30, door 12 is articulating from the vehicle and sliding at the same time, thereby resulting in a smooth motion for a vehicle user.

Second outboard hinge arm 16 includes three points 68, 26, 24. Second outboard hinge arm 16 is pivotally mounted at first mounting point 68 to vehicle body 70 such as vehicle body structure 18 as shown in FIGS. 1-5. Second outboard hinge arm 16 is pivotally mounted to slider member 28 at second point 26. Second outboard hinge arm 16 is received within third guide track 30 at third point 24.

In one non-limiting example, third guide track 30 may be mounted on door inner panel 76. In yet other non-limiting examples, third guide track 30 may be mounted on door hardware structures (not shown), or third guide track 30 may also be integral with second guide track 34. Third guide track 30 may extend beyond first guide track 32 and second guide track 34 in a longitudinal direction proximate to the aft area of the vehicle door to facilitate continuous movement of the door 12 upon opening and upon closing, as shown in the progressive opening of vehicle door 12 in FIGS. 1-5. It is to be understood that the aft area of the vehicle door is the area of the vehicle door that is closest to the rear of the vehicle, such as but not limited to, the rear bumper of the vehicle.

Moreover, in order to further facilitate smooth cooperation between upper outboard hinge arm 14 and lower outboard hinge arm 16 upon opening and closing of vehicle door 12, tie bar 72 may be implemented which may be affixed to first and second outboard hinge arms 14, 16 to allow for synchronized movement between upper and lower hinge arms 14, 16 42, 44. Also illustrated in FIGS. 1-5 is a plate 74 joined to slider members 28, 36. Plate 74 may be joined to slider members 28, 36 through mechanical fasteners, welding, adhesives, and/or other suitable joining methods. Plate 74, like tie bar 72, serves to stabilize slide members 28, 36 and facilitate synchronized movement between upper and lower slide members 28, 36 upon opening and closing of vehicle door 12.

While multiple embodiments have been described in detail, it will be apparent to those skilled in the art that the disclosed embodiments may be modified. Therefore, the foregoing description is to be considered exemplary rather than limiting.

What is claimed is:

1. A simultaneous movement system for a vehicle door, comprising:
    a first outboard hinge arm pivotally mounted to a vehicle body structure at a first end thereof;
    a second outboard hinge arm pivotally mounted to the vehicle body structure at a first end thereof, the second outboard hinge arm operatively configured to include a first point and a second point;
    a first guide track mounted to the vehicle door and operatively configured to receive a first slide member, the first slide member being pivotally mounted on a second end of the first outboard hinge member;
    a second guide track mounted to the vehicle door and operatively configured to receive a second slide member, the second slide member being pivotally mounted on the first point of the second outboard hinge member; and
    a curved third guide track operatively configured to receive the second point on the second outboard hinge arm;
    wherein the third guide track extends beyond the first guide track and the second guide track in a longitudinal direction to facilitate continuous movement of the door upon opening and upon closing.

2. The simultaneous movement system as defined in claim 1 wherein the second point of the second outboard hinge arm includes at least one roller operatively configured to move along the third guide track.

3. The simultaneous movement system as defined n claim 1 wherein the first guide track is an extruded member.

4. The simultaneous movement system as defined in claim 1 wherein the first guide track is a roll formed member.

5. The simultaneous movement system as defined in claim 1 wherein the third guide track is adjacent to the second guide track.

6. The simultaneous movement system as defined in claim 1, further comprising a tie-bar operatively configured to rigidly connect the second hinge arm with the first hinge arm.

7. The simultaneous movement system as defined in claim 6, further comprising a plate affixed to the first and second slide members.

8. The simultaneous movement system as defined in claim 1 wherein the second point is affixed to a tab which is operatively configured to slide and pivot within the third guide track.

9. A simultaneous movement system for a vehicle door, comprising:
    a first outboard hinge arm pivotally mounted to a vehicle body structure at a first end thereof, the first outboard hinge arm operatively configured to include a first point and a second point, the first point of the first outboard hinge arm being pivotally attached to a first slide member and the first slide member slidingly engaged with a first guide track;

a second outboard hinge arm pivotally mounted to the vehicle body structure at a first end thereof, the second outboard hinge arm operatively configured to include a first point and a second point, the first point of the second outboard hinge arm being pivotally attached to a second slide member slidingly engaged with a second guide track; and a third guide track mounted to the vehicle door, wherein the third guide track includes a first substantially curved portion and a first substantially linear portion, the third guide track being operatively configured to receive the second point on the second outboard hinge arm;

wherein at least a part of the curved portions of the third guide track extends beyond the first and second guide tracks.

10. The simultaneous movement system as defined in claim 9 wherein the third guide track is integral with the second guide track.

11. The simultaneous movement system as defined in claim 10 wherein the third guide track is adjacent to the second guide track.

12. The simultaneous movement system as defined in claim 9, further comprising a tie-bar operatively configured to rigidly connect the second outboard hinge arm with the first outboard hinge arm.

13. The simultaneous movement system as defined in claim 9, further comprising a plate affixed to the first and second slide members.

14. The simultaneous movement system as defined in claim 9 wherein the second points of the first outboard hinge arm and the second outboard hinge arms are each affixed to a tab operatively configured to slide and pivot, respectively, within the third track.

15. A vehicle door movement system comprising:

first and second hinge arms pivotally mounted to a vehicle body structure;

a first guide track mounted to the vehicle door and receiving a first slide member pivotally mounted to the first hinge arm;

a second guide track mounted to the vehicle door and receiving a second slide member pivotally mounted on the second hinge arm; and a curved third guide track operative with the second hinge arm.

16. The system as defined in claim 15 wherein the third guide track extends beyond the first guide track and the second guide track in a longitudinal direction to facilitate continuous movement of the door upon opening and upon closing.

17. The system as defined in claim 15 wherein the first hinge arm is pivotally mounted to the vehicle body structure at a first end, the second hinge arm is pivotally mounted to the vehicle body structure at a second end and is configured to include a first point and a second point, wherein the second guide track is pivotally mounted on the first point and the curved guide track receives the second point.

* * * * *